US005653651A

United States Patent [19]

Kawashima et al.

[11] Patent Number: 5,653,651

[45] Date of Patent: Aug. 5, 1997

[54] HYDRAULIC AUTOTENSIONER

[75] Inventors: Kazuki Kawashima; Tomoyoshi Egusa, both of Iwata, Japan

[73] Assignee: NTN Corporation, Osaka, Japan

[21] Appl. No.: 506,562

[22] Filed: Jul. 25, 1995

[30] Foreign Application Priority Data

Jul. 25, 1994 [JP] Japan ........................ 6-172465

[51] Int. Cl.[6] .............................. F16H 7/08

[52] U.S. Cl. .............................. 474/110

[58] Field of Search ..................... 474/101, 10 F, 474/110, 135

[56] References Cited

U.S. PATENT DOCUMENTS

| | | | |
|---|---|---|---|
| 5,259,820 | 11/1993 | Mott | 474/110 |
| 5,277,664 | 1/1994 | Mott | 474/110 |
| 5,304,099 | 4/1994 | Deppe et al. | 474/110 |
| 5,366,415 | 11/1994 | Church et al. | 474/110 |

*Primary Examiner*—Roger J. Schoeppel
*Attorney, Agent, or Firm*—Wenderoth, Lind & Ponack

[57] ABSTRACT

A hydraulic autotensioner is arranged so as to include a cylindrical body having a closed end, a plunger slidably mounted in the body and formed with a hole in a top surface thereof, and a rod having a bottom end which is inserted in the hole. The plunger partitions the interior of the cylindrical body into a pressure chamber and a reservoir chamber. The pressure chamber communicates with the reservoir chamber through a return passage. A pressure control spring biases the rod and the plunger in a direction out of the cylindrical body. The return passage is defined by an axial through hole extending through the bottom surface of the plunger. A groove is formed in the inner peripheral surface of the plunger or in a surface of a bottom portion of the rod.

4 Claims, 4 Drawing Sheets

9 7 8 4 1 5 6 11 A 17 2 14 19 3 12 15 13 10

19 2 3 15

HYDRAULIC AUTOTENSIONER

BACKGROUND OF THE INVENTION

The present invention relates to a hydraulic autotensioner for maintaining a constant tension on a belt, such as a timing belt for driving cam shafts of an automotive engine.

A conventional hydraulic autotensioner of this type is disclosed in Unexamined Japanese Patent Publication 2-245555.

Referring to FIG. 5, the conventional autotensioner includes a cylindrical body 1, and a plunger 2. The plunger 2 is slidably mounted in the body 1 and has a recess 3 formed in the top thereof. A rod 5 slidably extends through a seal member 4 provided in a top opening of the body 1 and has a bottom end which is received in the recess 3. A pressure control spring 6 is mounted in the body 1 and biases the belt tension control member A, which includes the plunger 2 and the rod 5. The control member A is biased in a direction such that the control member protrudes from the body 1 so as to apply tension to a belt 9 through a tension pulley 8 carried by a pivotable pulley arm 7.

The plunger 2 of the belt tension control member A partitions the interior of the body 1 into a pressure chamber 10 and a reservoir chamber 11. The chambers 10 and 11 communicate with each other through a return passage 12. A check valve 13 is provided which checks the flow of hydraulic oil from the pressure chamber 10 into the reservoir chamber 11 through the return passage 12.

When the tension in the belt 9 increases, the rod 5 is pushed downward (in FIG. 5), so that the pressure in the pressure chamber 10 increases. Namely, the pressure in the pressure chamber 10 and the biasing force of the pressure control spring 6 resist the pressure applied to the rod 5 by the belt.

When the downward pressure applied to the rod exceeds the sum of the pressure in the pressure chamber 10 and the biasing force of the pressure control spring 6, the hydraulic oil in the pressure chamber 10 begins to leak into the reservoir chamber 11 through a narrow gap 14 defined between the inner surface of the body 1 and the plunger 2.

When the tension in the belt 9 begins to decrease, the pressure control spring 6 pushes the belt tension control member A out of the body 1, thus re-tensioning the belt 9.

When the plunger 2 begins to move upwardly due to decreasing tension in the belt, the check valve 13 instantly opens return passage 12, thus allowing hydraulic oil in the reservoir chamber 11 to flow back into the pressure chamber 10 through the return passage 12, so that the belt tension control member A can quickly move toward the belt. Any slack of the belt is thus absorbed by the extension of belt tension control member A.

One important requirement for such an autotensioner is that the belt tension control member A must be able to respond quickly to sudden slackening of the belt. If the response time is poor, the belt can skip a tooth or two of any gear with which it engages. In order for the belt tension control member A to smoothly protrude from the body if the belt slackens suddenly, the flow resistance encountered by the hydraulic oil while flowing through the return passage 12 has to be as small as possible.

In the conventional autotensioner, the return passage 12 formed in the belt tension control member A is formed by an axial hole 15 formed in the plunger 2, and a T-shaped hole 16 formed in the rod 5. Forming the T-shaped hole 16 is time-consuming and expensive because it is formed by drilling. Moreover, burrs tend to form at the junction between the axial portion **16*a* and the diametric portion 16*b* of the T-shaped hole 16. In order to remove such burrs, the hole 16 which is formed by drilling has to be reamed, which further increases the trouble and costs associated with forming the hole 16**.

An object of the present invention is to provide an autotensioner which has a return passage through which the pressure chamber can communicate with the reservoir chamber and which can be formed easily at low cost.

SUMMARY OF THE INVENTION

According to the present invention, there is provided a hydraulic autotensioner including a cylindrical body having a closed end, a plunger slidably mounted in the body with a narrow gap defined therebetween and formed with a hole in a top surface thereof, and a rod having a bottom end thereof inserted in the hole. The plunger and the rod serve as a belt tension control means, and the plunger partitions the interior of the body into a pressure chamber and a reservoir chamber. The pressure control means has a return passage through which the pressure chamber communicates with the reservoir chamber. A check valve is provided in the return passage for checking the flow of hydraulic oil from the pressure chamber into the reservoir chamber through the return passage. Also, a pressure control spring is provided to bias the belt tension control means in a direction out of the cylindrical body. The return passage is defined by an axial hole extending from the bottom of the hole to the bottom surface of the plunger and a groove formed in one of the inner surface of the plunger and the surface of the bottom portion of the rod.

Since the return passage is defined by the axial hole and the groove, there is no need to drill a hole in the rod. Such a groove can be formed very easily because it can be formed by cold forging.

Other features and objects of the present invention will become apparent from the following description with reference to the accompanying drawings, in which:

DETAILED DESCRIPTION OF THE PREFERRED EMBODIMENT

Now referring to FIGS. 1–4, an embodiment of the present invention is described.

Figure 1:
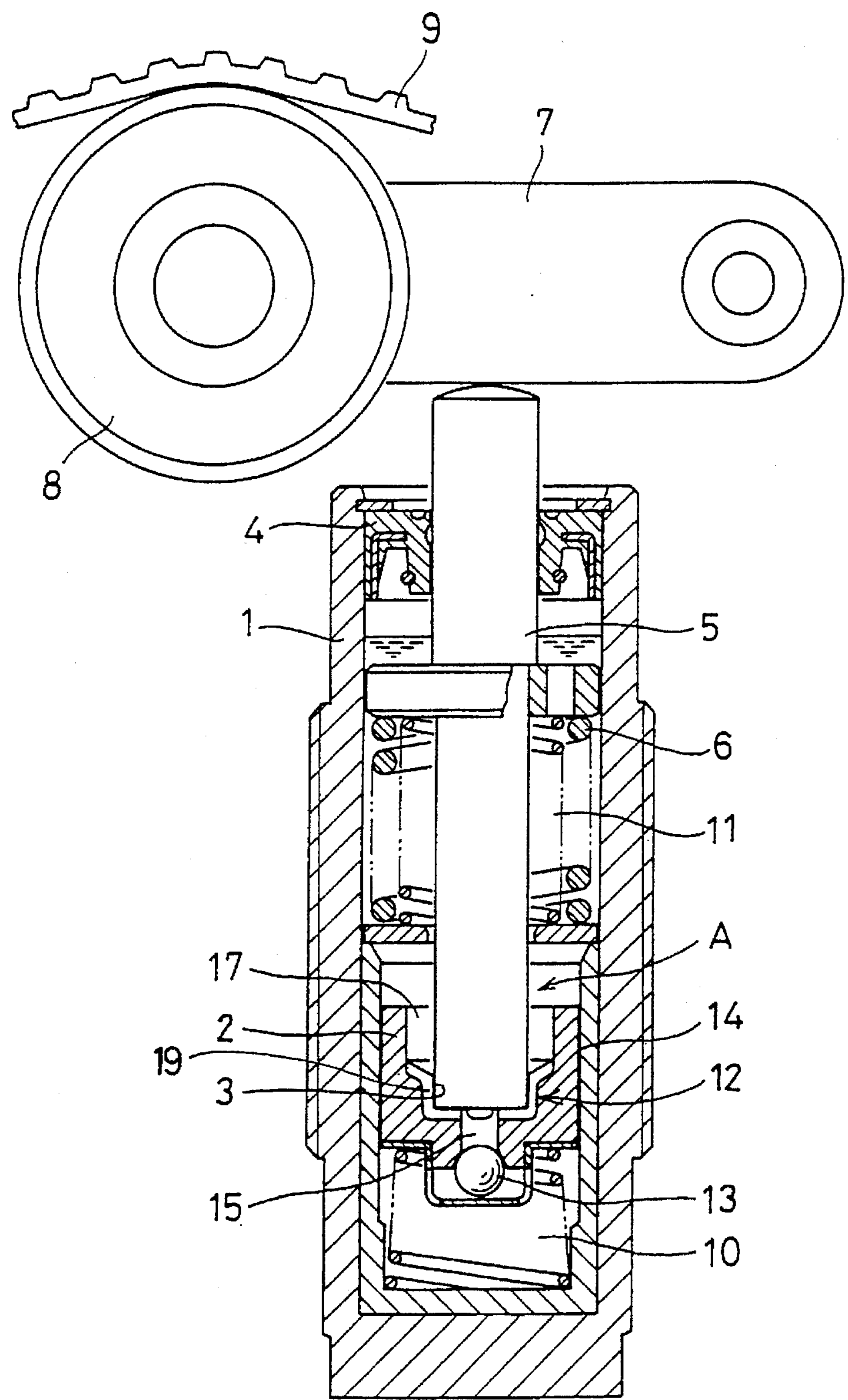
FIG. 1 is a sectional view of a first embodiment of an autotensioner according to the present invention.
Figure 5:
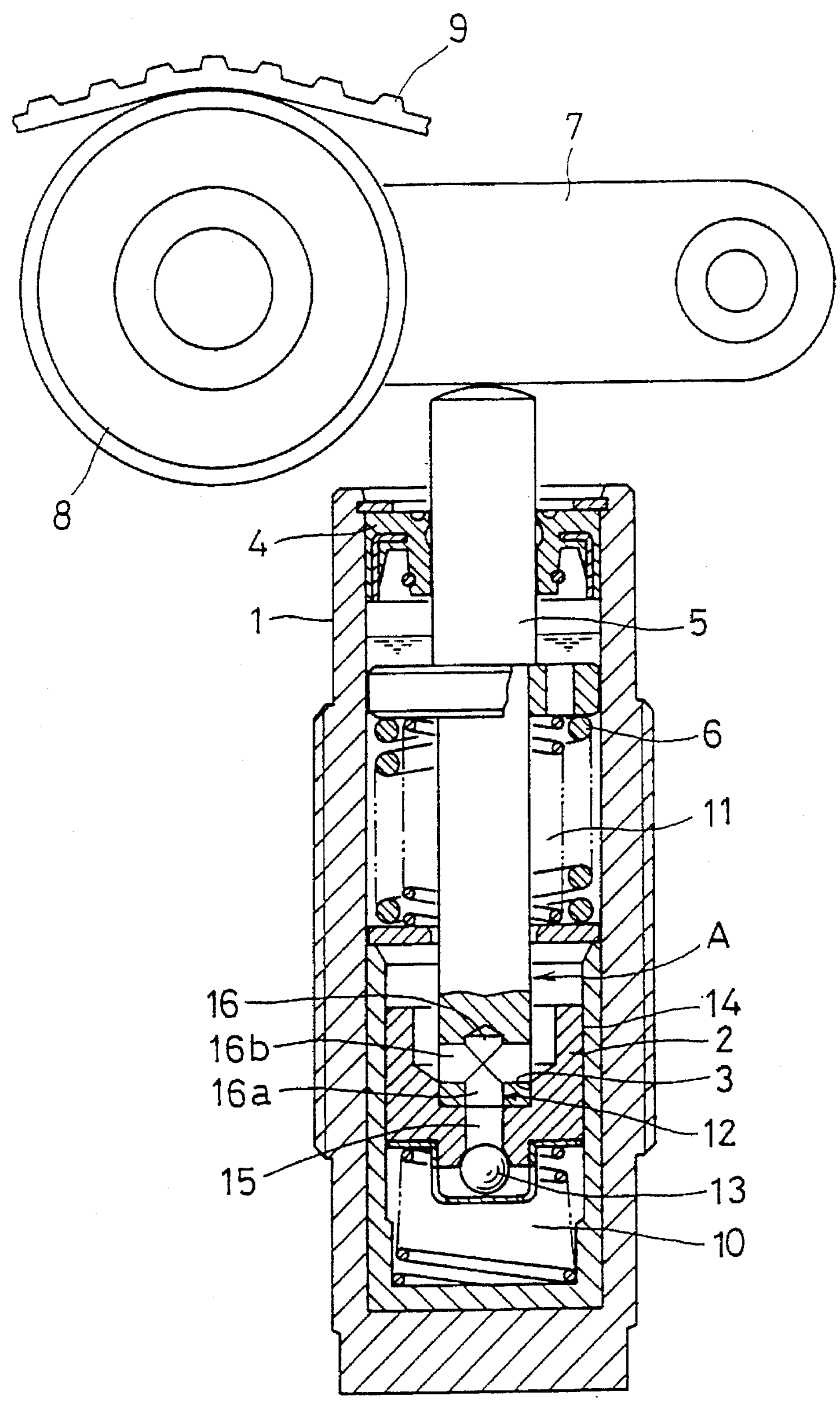
FIG. 5 is a sectional view of a conventional autotensioner.

In these figures, the elements depicted in FIG. 1 are denoted by the same reference numerals used in FIG. 5 and thus their description is omitted.

Figure 2:
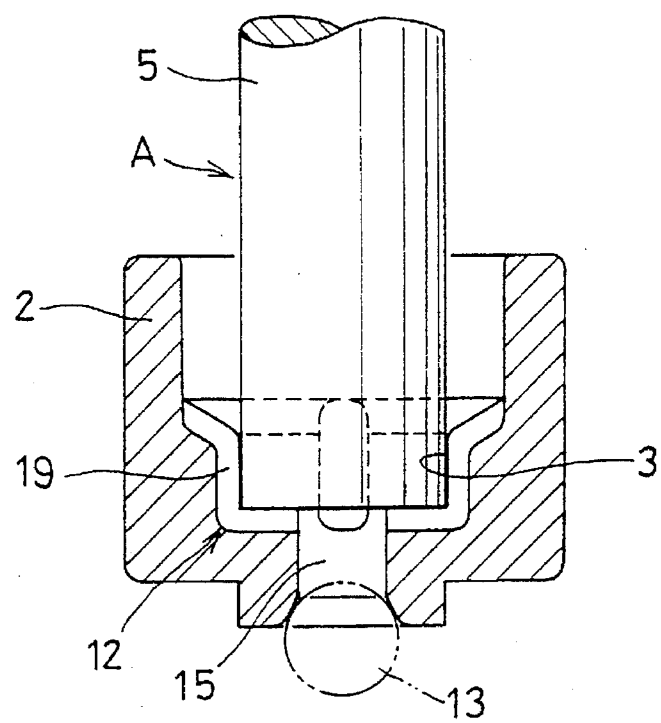
FIG. 2 is a sectional view of a belt tension control member of the autotensioner shown in FIG. 1.
Figure 3:
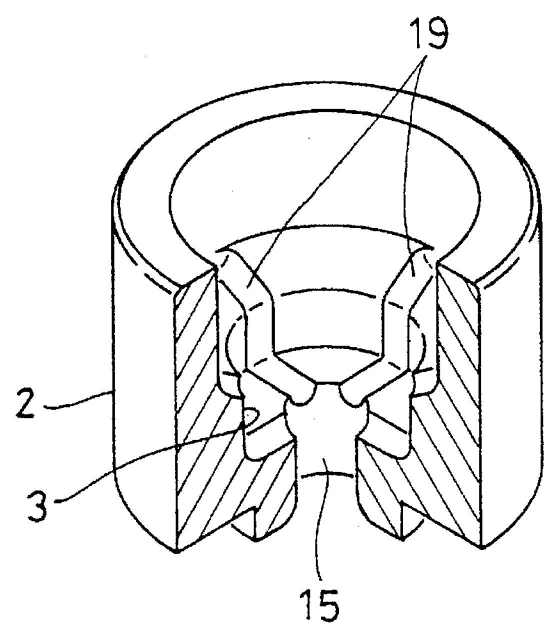
FIG. 3 is a partially cutaway perspective view of a plunger of the autotensioner shown in FIG. 1.

Similar to the arrangement of FIG. 5, the belt tension control member A shown in FIGS. 1–3 also includes a plunger 2 and a rod 5. The plunger 2 has a large-diameter hole 17 in its top surface which faces reservoir chamber 11. The rod 5 is inserted in a hole 3 formed in the bottom of the large-diameter hole 17.

The return passage 12 formed in the belt tension control member A, is defined by an axial hole 15 extending from the bottom of the hole 3 to a bottom surface of the plunger 2, and a plurality of grooves 19 are formed in an inner peripheral surface of the hole 3. The grooves 19 have inner ends communicating with the axial hole 15 and outer ends opening at the bottom of the large-diameter hole 17.

The plunger 2 is formed by cold-forging a cold-forgeable material such as steel or aluminum. When forming the plunger 2 by cold forging, the grooves 19 are formed simultaneously.

Since the grooves 19 are formed in the inner peripheral surface of the hole 3 of the plunger 2 simultaneously when forming the plunger by cold forging, they can be formed much more easily and at a much lower cost than a T-hole, which has to be formed by drilling.

Figure 4:
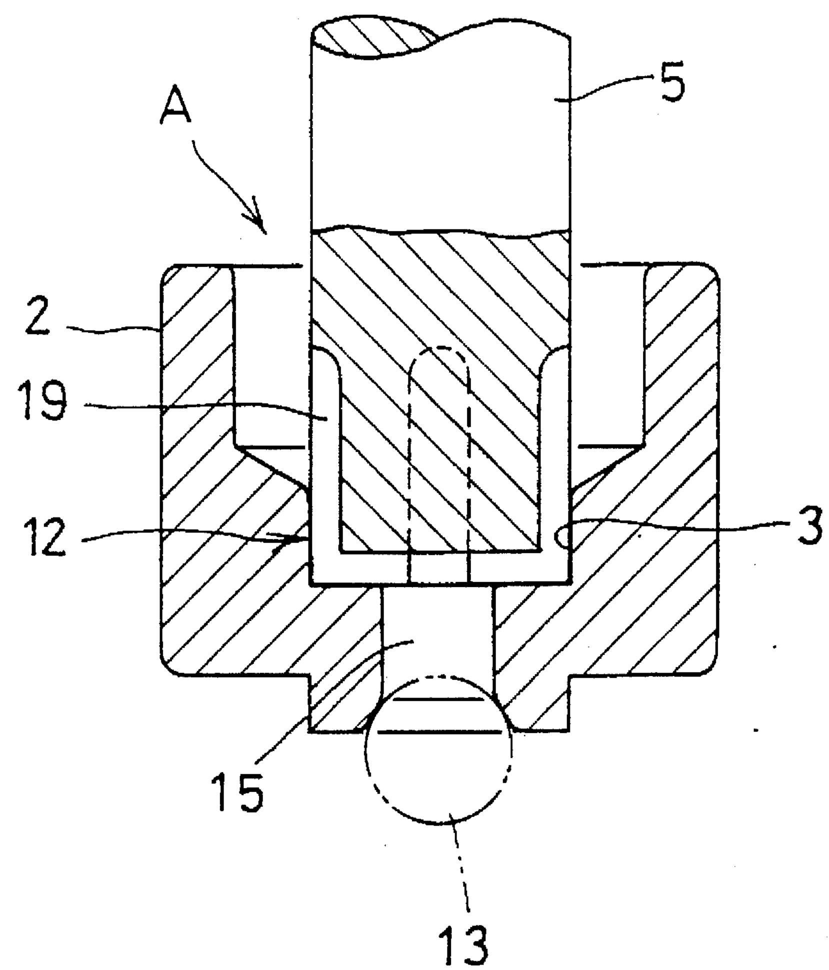
FIG. 4 is a sectional view of a second embodiment of the present invention.

FIG. 4 shows another embodiment, in which a plurality of grooves 19 are formed, not in the inner peripheral surface of the plunger, but in the bottom end surface and the lower outer peripheral surface of the rod 5 so as to communicate with the axial hole 15 formed in the plunger 2.

The grooves 19 can also be formed by cold forging, so that they can be formed relatively easily and at low cost.

With this arrangement, there is no need to drill a hole in the rod. The grooves, according to the present invention, can be formed very easily by cold forging at a low cost.

What is claimed is:

1. An oil-sealed type tensioner comprising:

a hollow cylindrical body defining an interior space and having a closed first end and an open second end;

a cylindrical plunger, mounted in said cylindrical body so as to engage and be axially slidable along an inner peripheral surface of said cylindrical body, said plunger defining an interior space, having a first end, and partitioning said interior space of said cylindrical body into a pressure chamber and a reservoir chamber;

an oil seal positioned in said open second end of said cylindrical body to seal oil within said interior space of said cylindrical body;

a rod connected to said plunger and slidably extending through said oil seal, said rod being axially movable together with said plunger with respect to said cylindrical body;

a pressure control spring biasing said rod and said plunger away from said closed first end of said cylindrical body;

a pressure control passage providing fluid communication between said pressure chamber and said reservoir chamber, said passage being defined by a through hole formed in said first end of said plunger, and at least one groove being formed in an inner peripheral surface of said plunger and communicating with said through hole; and a check valve provided at said passage for checking flow of oil from said pressure chamber into said reservoir chamber.

2. The oil-sealed type tensioner as claimed in claim 1, wherein said at least one groove comprises a plurality of grooves formed in said inner peripheral surface of said plunger.

3. An oil-sealed type tensioner comprising:

a hollow cylindrical body defining an interior space and having a closed first end and an open second end;

a cylindrical plunger, mounted in said cylindrical body so as to engage and be axially slidable along an inner peripheral surface of said cylindrical body, said plunger defining an interior space, having a first end, and partitioning said interior space of said cylindrical body into a pressure chamber and a reservoir chamber;

an oil seal positioned in said open second end of said cylindrical body to seal oil within said interior space of said cylindrical body;

a rod connected to said plunger and slidably extending through said oil seal, said rod being axially movable together with said plunger with respect to said cylindrical body;

a pressure control spring biasing said rod and said plunger away from said closed first end of said cylindrical body;

a pressure control passage providing fluid communication between said pressure chamber and said reservoir chamber, said passage being defined by a through hole formed in said first end of said plunger, and at least one groove formed in an outer peripheral surface of a lower end of said rod such that said at least one groove communicates with said through hole; and a check valve provided at said passage for checking flow of oil from said pressure chamber into said reservoir chamber.

4. The oil-sealed type tensioner as claimed in claim 3, wherein said at least one groove comprises a plurality of grooves formed in said outer peripheral surface of said lower end of said rod.

* * * * *